Patented Dec. 7, 1948

2,455,811

UNITED STATES PATENT OFFICE 2,455,811

HYDROAROMATIC SULFONATES AND THEIR PREPARATION

Hans Schindler, Evanston, Ill., assignor to The Pure Oil Company, Chicago, Ill., a corporation of Ohio No Drawing. Application October 23, 1944, Serial No. 560,045

9 Claims. (Cl. 260—505)

The object of this invention is to provide novel compounds having surface active characteristics which make them highly effective as detergents and emulsifying agents, and to provide a method for preparing such compounds.

I have discovered that compounds having surface active characteristics can be prepared by sulfonation of aromatic compounds having one or more hydrogens in the aromatic nucleus substituted with one or more carbocyclic ring compounds having more nuclear hydrogen than is present in an aromatic ring. As examples of compounds falling within the scope of my invention are cyclohexyltetrahydronaphthalene, 4-indanylcyclohexylbenzene, sulfonated 4-indanylphenyl-α-decalin and sulfonated dicyclohexyltetralin. These compounds before sulfonation are represented by the following formulae:

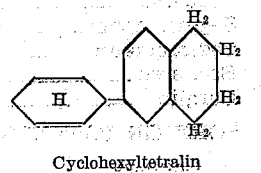

Cyclohexyltetralin

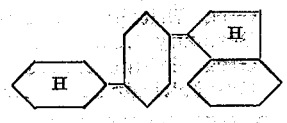

4-indanylcyclohexylbenzene

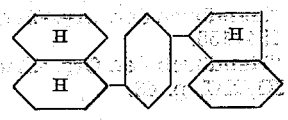

4-indanylphenyl-α-decalin

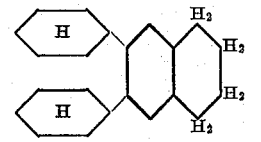

Dicyclohexyltetralin

In the above formulae the letter H in a ring indicates that the ring is entirely saturated with hydrogen. In general compounds falling within the scope of my invention are prepared by condensing an aromatic hydrocarbon, which may or may not be partially saturated with hydrogen, with cyclic olefins or unsaturated napthene hydrocarbons.

Compounds falling within the scope of my invention may be in general prepared by condensing an aromatic hydrocarbon with the cyclic olefin or unsaturated napthene hydrocarbon in the presence of cold sulfuric acid or aluminum chloride. As an example, in the preparation of 4-indanylcyclohexylbenzene, cyclohexylbenzene can be condensed with indene in the presence of aluminum chloride. As another example, in the preparation of 4-indanylphenyl-α-decalin, alpha-phenyldecalin is prepared by first condensing benzene with octahydronaphthalene, and then condensing the alpha-phenyldecalin with indene using aluminum chloride as condensation catalyst.

In the preparation of dicyclohexyltetralin, cyclohexyltetralin is first prepared by condensation of a molecular excess of tetralin with cyclohexane in the presence of cold sulfuric acid followed by condensation of the cyclohexyltetralin with cyclohexane in the presence of aluminum chloride, reaction being carried out in a solution of cyclohexane at a temperature of approximately 65–70° F.

In order to illustrate the invention sulfonated cyclohexyltetralin was prepared by adding 82 grams of cyclohexene to a mixture of 396.2 grams of tetralin and 92 grams of concentrated sulfuric acid maintained in a cooling bath at a temperature of 41–50° F. The mixture was constantly stirred while the cyclohexane was added over a period of 1½ hours. Stirring was continued after the addition of all the cyclohexene for one hour without cooling, and the temperature reached 86° F. The hydrocarbon layer was then separated from the acid and washed twice with cold concentrated sulfuric acid, and then washed with water, followed by dilute causitc soda solution and again washed with water. The resulting hydrocarbon was distilled to remove unreacted tetralin. 134 grams of material boiling above 446° F. was obtained representing a yield of 62.6% of theoretical yield. The reaction product was determined to have the following characteristics:

| | |
|---|---|
| Density $4^{20}$ | 0.9896 |
| A. P. I. gravity | 11.0 |
| Saybolt viscosity at 100° F | 88.9 |
| Saybolt viscosity at 130° F | 55.9 |
| Saybolt viscosity at 210° F | 36.0 |
| Viscosity index | 58 |
| Pour point, °F | 30 |
| $n_D^{20}$ | 1.5513 |
| Molecular weight | 206 |

The molecular weight of cyclohexyltetralin is 214, thus indicating that the hydrocarbon product is not pure cyclohexyltetralin.

The product was then sulfonated with concentrated sulfuric acid in the proportion of 50 grams of hydrocarbon to 138 grams (75 cc.) of concentrated sulfuric acid. The mixture was stirred for one hour without any attempt to control the temperature and the temperature rose to 110° F. The sulfonated mixture was then mixed with 500 cc. of water, and sulfonic acid separated as an upper layer with a strong blue fluorescense. The sulfonic acid was separated from the mixture, mixed with 150 cc. of water and made alkaline with sodium hydroxide. The alkaline solution was then filtered and evaporated to dryness. The residue was taken up in ether in order to dissolve the sodium sulfonates and the insoluble sodium sulfate was filtered off. The sodium sulfonates were recovered from the ether solution by evaporating the ether. 55 grams of purified sodium sulfonate was thus obtained corresponding to 80.5% of theoretical yield based on the hydrocarbon subjected to sulfonation. The free sulfonic acid was prepared from the sodium sulfonate by acidification with anhydrous HCl. This material was determined to have a molecular weight of 290 as against a calculated molecular weight of 294.

An emulsifiable oil was prepared by mixing together 74.7% by weight of mineral oil, 13.7% by weight of sodium sulfonate prepared as just described, 2.2% by weight of diethylene glycol, 5.5% by weight of oleic acid and 2.7% by weight of 20% caustic soda solution. The composition gave a stable emulsion and was satisfactory for use as a soluble cutting oil.

The mineral oil used in the above-described composition was a Western neutral having a viscosity of 100 seconds Saybolt at 100° F.

Sulfonic acids, or sulfonates prepared in accordance with my invention are useful, in general, as emulsifying agents and detergents and wherever a surface active material is useful, but are specially useful in the preparation of soluble oils for cutting and similar purposes.

It is claimed:

1. The method of preparing a surface active compound comprising condensing indene with benzene in which one hydrogen is substituted with a hydroaromatic radical and sulfonating the resulting product.

2. Method in accordance with claim 1 in which the condensation is carried out in the presence of aluminum chloride as the catalyst.

3. Method in accordance with claim 1 in which the hydroaromatic radical is the cyclohexyl radical.

4. Method in accordance with claim 1 in which the hydroaromatic radical is the octahydronaphthyl radical.

5. The method of preparing a surface active composition comprising condensing cyclohexyl benzene with indene in the presence of aluminum chloride as the condensation catalyst and sulfonating the resulting condensation product.

6. The method of preparing a surface active composition comprising condensing alpha-phenyl-decalin with indene in the presence of aluminum chloride as catalyst and sulfonating the resulting condensation product.

7. The sulfonated compound

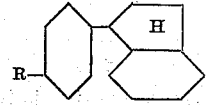

in which R is a hydroaromatic group.

8. Compound in accordance with claim 7 in which R is the cyclohexyl radical.

9. Compound in accordance with claim 7 in which R is the octahydronaphthyl radical.

HANS SCHINDLER.

REFERENCES CITED

The following references are of record in the file of this patent:

UNITED STATES PATENTS

| Number | Name | Date |
| --- | --- | --- |
| 1,750,198 | Schrauth | Mar. 11, 1930 |
| 1,758,277 | Daimler | May 13, 1930 |
| 1,787,408 | Pospiech | Dec. 30, 1930 |
| 1,988,832 | De Groote | Jan. 22, 1935 |
| 2,028,271 | Brodersen | Jan. 21, 1936 |
| 2,054,140 | Segessemann | Sept. 15, 1936 |
| 2,076,166 | Segessemann | Apr. 6, 1937 |
| 2,199,776 | Becherer | May 7, 1940 |
| 2,202,686 | Borglin | May 28, 1940 |

FOREIGN PATENTS

| Number | Country | Date |
| --- | --- | --- |
| 263,873 | Great Britain | May 31, 1928 |
| 438,466 | Germany | May 8, 1930 |
| 364,537 | Great Britain | Dec. 22, 1931 |
| 416,379 | Great Britain | Sept. 6, 1934 |

OTHER REFERENCES

Beilstein, "Handbuch der. Org. Chem.," 4th Ed., vol. XI, pp. 154, 155.

Beilstein, "Handbuch der. Org. Chem.," 4th Ed., Suppl. vol. XI/XII, p. 43.

Certificate of Correction

Patent No. 2,455,811.  December 7, 1948.

HANS SCHINDLER

It is hereby certified that errors appear in the printed specification of the above numbered patent requiring correction as follows:

Column 2, lines 16 and 17, 19, 29, for "cyclohexane" read *cyclohexene*; and that the said Letters Patent should be read with these corrections therein that the same may conform to the record of the case in the Patent Office.

Signed and sealed this 22nd day of March, A. D. 1949.

[SEAL]

THOMAS F. MURPHY,
*Assistant Commissioner of Patents.*